UNITED STATES PATENT OFFICE.

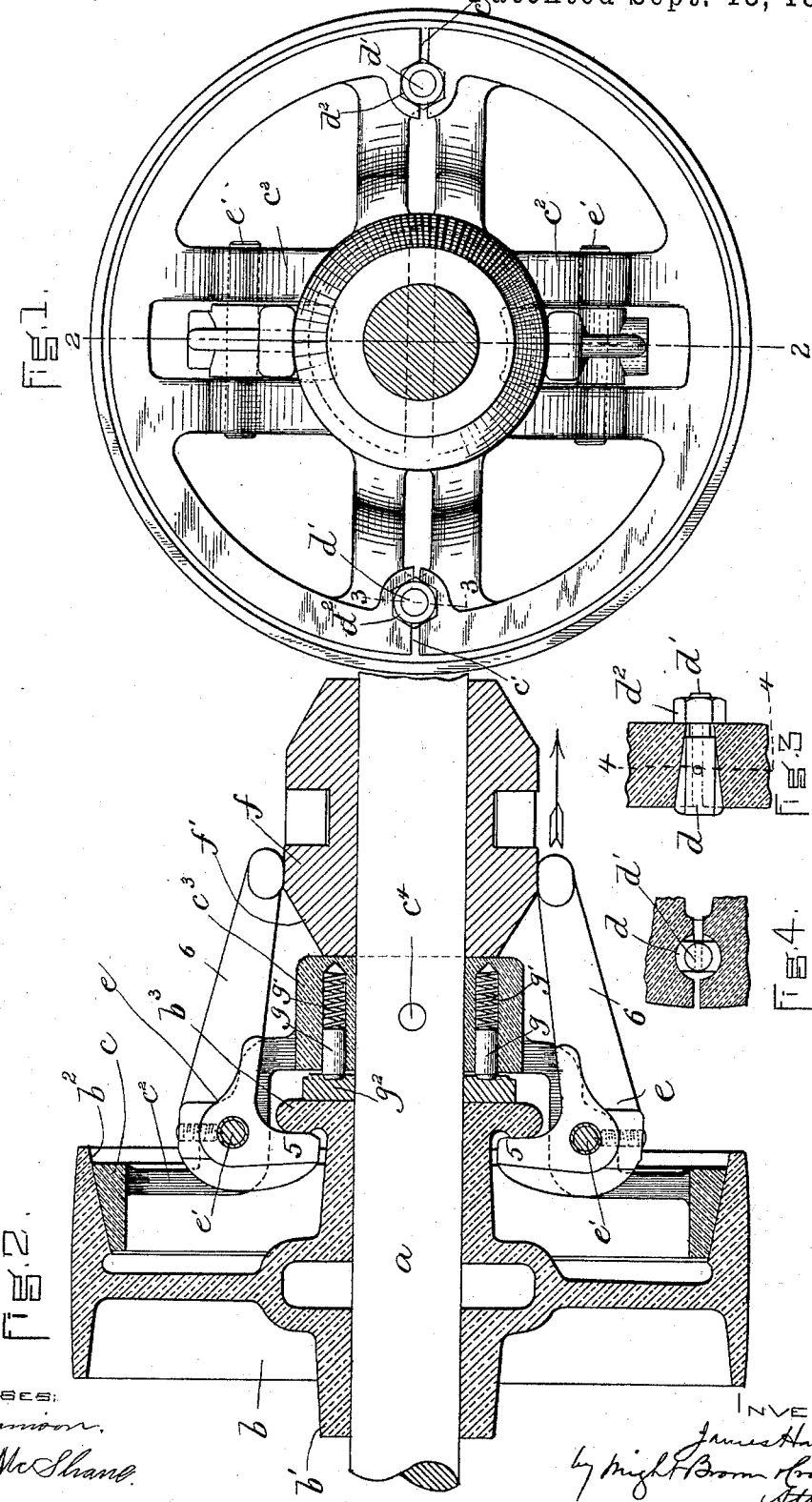

JAMES HARTNESS, OF SPRINGFIELD, VERMONT.

CLUTCH.

SPECIFICATION forming part of Letters Patent No. 482,523, dated September 13, 1892.

Application filed February 15, 1892. Serial No. 421,518. (No model.)

*To all whom it may concern:*

Be it known that I, JAMES HARTNESS, of Springfield, in the county of Windsor and State of Vermont, have invented certain new and useful Improvements in Friction-Clutches, of which the following is a specification.

This invention has for its object to provide improved means for connecting a loose pulley with a clutch member which is affixed to and rotates with the shaft supporting said pulley, and particularly to secure the following points of advantage in the construction of a loose pulley and the clutch adapted to engage the same with the shaft, viz: first, to enable the hub of the loose pulley to be made of sufficient length to afford a durable bearing on the shaft and to extend an equal distance from each side of the center of the line of strain of the belt rotating said pulley; second, to provide frictional surfaces of such an area that the construction will be durable and the frictional connection powerful without injurious strain; third, to reduce the total length of the pulley clutch member, so that the construction will be as compact as possible. These results I attain by the construction which I will now proceed to describe.

In the accompanying drawings, forming a part of this specification, Figure 1 represents a side view of a loose pulley and a clutch member embodying my invention and a transverse section of the shaft on which said parts are mounted. Fig. 2 represents a section on line 2 2, Fig. 1. Fig. 3 represents a section on line 3 3, Fig. 1. Fig. 4 represents a section on line 4 4, Fig. 3.

The same letters and figures of reference indicate the same parts in all the figures.

In the drawings, $a$ represents a countershaft, and $b$ represents a loose pulley mounted thereon, said pulley having a hub $b'$ encircling the shaft. The pulley $b$ is provided on the inner side of its rim with a friction-surface $b^2$, which is preferably beveled, as shown in Fig. 2. One end of the hub $b'$ is provided with an outwardly-projecting flange $b^3$, the purpose of which will be presently explained.

$c$ represents a friction ring or clutch, which is formed to closely fit the friction-surface $b^2$ on the pulley. Said ring is divided at $c'$, Fig. 1, into sections, the division enabling the ring to be expanded to compensate for wear of its outer surface, as hereinafter described. The ring $c$ is connected by arms $c^2$ with a hub $c^3$, which is rigidly affixed to the shaft $a$ by any suitable means, such as by a pin $c^4$, driven through said hub and shaft. The hub $c^3$ is offset from the ring $c$, or, in other words, is located at one side of the circle of said ring, so that while the ring enters the interior of the pulley $b$ the hub $c^3$ is at one end of the hub of said pulley, as shown in Fig. 2. This relative arrangement of the ring $c$ and hub $c^3$ requires the arms $c^2$ to be offset, as shown, so that each arm has a sufficient degree of flexibility to enable the sections of the ring $c$ to be adjusted or sprung outwardly to compensate for wear. I have here shown each arm $c^2$ as bent at two points to give it the desired offset form; but it is obvious that each arm may extend in a straight or approximately straight line from the hub to the ring $c$, in which case the arms would be inclined.

The means here shown for expanding the ring $c$ to compensate for the wear of its outer surface are wedges $d\ d$, which are formed on or affixed to bolts $d'\ d'$, and are fitted in sockets or cavities formed for their reception in the ends of the sections of the ring $c$. Each bolt $d'$ has a nut $d^2$, by which it may be moved endwise to cause the wedge $d$ to separate the ends of the sections between which said wedge is located.

$e\ e$ represent bell crank levers which are pivoted at $e'\ e'$ to suitable parts of the clutch member, preferably to two of the arms $c^2 c^2$, said arms having sockets for the reception of the pivot rods or bolts $e'$. Each lever $e$ comprises a shorter inwardly-projecting arm 5, which is arranged to bear on the inner side of the flange $b^3$ of the pulley-hub, and a longer arm 6, which extends in a direction approximately parallel to the shaft $a$ and is arranged so that when moved outwardly from the shaft the shorter arm 5 will be moved against flange $b^3$ in the direction required to move the pulley $b$ into frictional contact with the ring $c$. The described outward movement of the longer arms 6 may be effected by any suitable means. I have here shown a conical collar or sleeve $f$, mounted to slide upon the shaft $a$ and formed to be engaged with a suitable shipping device, whereby said rod may be moved upon the shaft lengthwise of the latter. When the sleeve $f$ is in the position shown in Fig. 2, its largest diameter is in contact with the outer ends of the longer arm 6 and holds said arms outwardly from the shaft, thus causing engagement of the pulley with the ring $c$. When the sleeve $f$ is moved in the direction indicated by the arrow in Fig. 2, its tapered or conical end $f'$ permits the longer arm 6 to spring inwardly sufficiently to release the pulley and permit its separation from frictional engagement with the ring $c$. If desired, the hub $c^3$ may be provided with studs $g$ and springs $g'$, arranged to move the pulley $b$ away from the ring $c$ when the levers $e$ $e$ are released, said studs pressing against a washer $g^2$, interposed between their outer ends and the flanged end of the hub $b'$.

It will be seen that the offset form of the clutch member, comprising the ring $c$, arm $c^2$, and hub $c^3$, enable the hub $b'$ of the loose pulley to be made of such length as to afford an elongated bearing upon the shaft $a$, said bearing being sufficient to firmly support the pulley against all strains exerted upon it. It will also be seen that the offset form of the arms $c^2$ enables them to yield or spring readily to permit the expansion of the ring $c$ by adjustment of the wedges $d$. The arrangement of the ring $c$ in the interior of the pulley $b$ enables said ring and the co-operating friction-surface $b^2$ to be made of sufficient diameter to afford a large area of frictional surface without imposing excessive strain on the parts.

I do not limit myself to the devices here shown for expanding the ring $c$ to compensate for wear, nor to the employment of the springs $g'$ for separating the pulley from the ring. It is obvious that the longer arm 6 of the bell-crank levers $e$ may be actuated by any other suitable means, my invention not being limited to the conical sleeve $f$.

I claim—

1. The combination of a shaft, a loose pulley thereon, a friction-clutch member comprising a hub affixed to the shaft, a divided ring formed to engage a clutch-surface on the pulley and provided with means whereby it may be expanded to compensate for wear, and independently-movable arms connecting the parts of said ring with the hub, said arms permitting the expansion of the ring, and means for engaging the pulley with said ring, as set forth.

2. The combination of a shaft, a loose pulley thereon having a flanged hub and a friction-surface, a friction-clutch member composed of a divided ring formed to engage the friction-surface of the pulley, means for expanding the ring to compensate for its wear, a hub affixed to the shaft and offset from the said ring, and a series of flexible arms connecting the said hub with the ring, a series of bell-crank levers pivotally connected to said arms and having inwardly-projecting shorter arms engaged with the flange of the pulley-hub and longer arms arranged so that when moved outwardly from the shaft they will cause the shorter arms to engage the pulley with the clutch member, and means for moving said longer arms, as set forth.

3. The combination of a shaft, a loose pulley having an internal clutch-surface, a divided or sectional ring formed to engage said surface, independently-movable arms connecting the parts of said ring with the hub, adjustable wedges interposed between the ends of the sections of the ring, whereby the ring may be expanded to compensate for wear, and means for moving the pulley to engage it with the ring, as set forth.

In testimony whereof I have signed my name to this specification, in the presence of two subscribing witnesses, this 15th day of January, A. D. 1892.

JAMES HARTNESS.

Witnesses:
OTIS GRIDLEY,
W. D. WOOLSON.